United States Patent
Sauron et al.

(10) Patent No.: US 6,570,118 B2
(45) Date of Patent: May 27, 2003

(54) ARC WELDING SYSTEM AND A PROCESS THEREFOR

(75) Inventors: Jean Sauron, Draveil (FR); Gil Gaunt, Saint Fargeau-Ponthierry (FR)

(73) Assignee: Societe Joseph Sauron Materiel Industriel Z. I. les Bordes, Bondoufle (FR)

(*) Notice: Subject to any disclaimer, the term of this patent is extended or adjusted under 35 U.S.C. 154(b) by 4 days.

(21) Appl. No.: 09/805,372

(22) Filed: Mar. 14, 2001

(65) Prior Publication Data
US 2002/0125216 A1 Sep. 12, 2002

(30) Foreign Application Priority Data
Mar. 15, 2000 (FR) ............................................ 00 03312

(51) Int. Cl.⁷ ............................................... B23K 9/095
(52) U.S. Cl. ..................................... 219/54; 219/124.34
(58) Field of Search ............................. 219/54, 124.34, 219/125.1, 137 R; 901/42

(56) References Cited

U.S. PATENT DOCUMENTS

| | | | | |
|---|---|---|---|---|
| 3,308,266 A | * | 3/1967 | Adams, Jr. ............... | 219/137 R |
| 4,315,129 A | * | 2/1982 | Wilkinson et al. ...... | 219/124.34 |
| 4,672,173 A | | 6/1987 | Nomura et al. | |
| 4,686,341 A | * | 8/1987 | Nomura et al. ............... | 219/54 |
| 4,959,523 A | * | 9/1990 | Fihey et al. ........... | 219/124.34 |
| 6,201,216 B1 | * | 3/2001 | Mumaw ...................... | 219/54 |
| 6,278,074 B1 | * | 8/2001 | Morlock et al. .............. | 219/54 |

FOREIGN PATENT DOCUMENTS

| | | |
|---|---|---|
| CH | 418 490 A1 | 10/1964 |
| FR | 2 572 326 A1 | 10/1984 |

OTHER PUBLICATIONS

R. Lahnsteiner; "Welding of railway tracks by a high–efficiency narrow–gap MAG–process"; 8381 Welding Review International; Nov. 12, 1993; pp. 200–202 & 204; vol. 12 No. 4; Redhill, Surrey, GB.

* cited by examiner

*Primary Examiner*—Clifford C. Shaw
(74) *Attorney, Agent, or Firm*—Rothwell, Figg, Ernst & Manbeck

(57) ABSTRACT

An electric arc welding robot for welding a zone of a rail or the like comprises a movable, electric arc torch unit for operating the welding, first controlling means for controlling a first displacement of the torch unit substantially in front of the periphery of the zone to be welded, so that welding geometrical locations are read on said zone, by means of reading means connected to a memory unit, for memorizing said welding geometrical locations read on the rail, and second controlling means for automatically controlling a second displacement of the torch unit in front of the zone to be welded, within the limits of said reading and as a function of the welding geometrical locations, as memorized.

14 Claims, 6 Drawing Sheets

FIG_1

FIG_4

Figure 1:
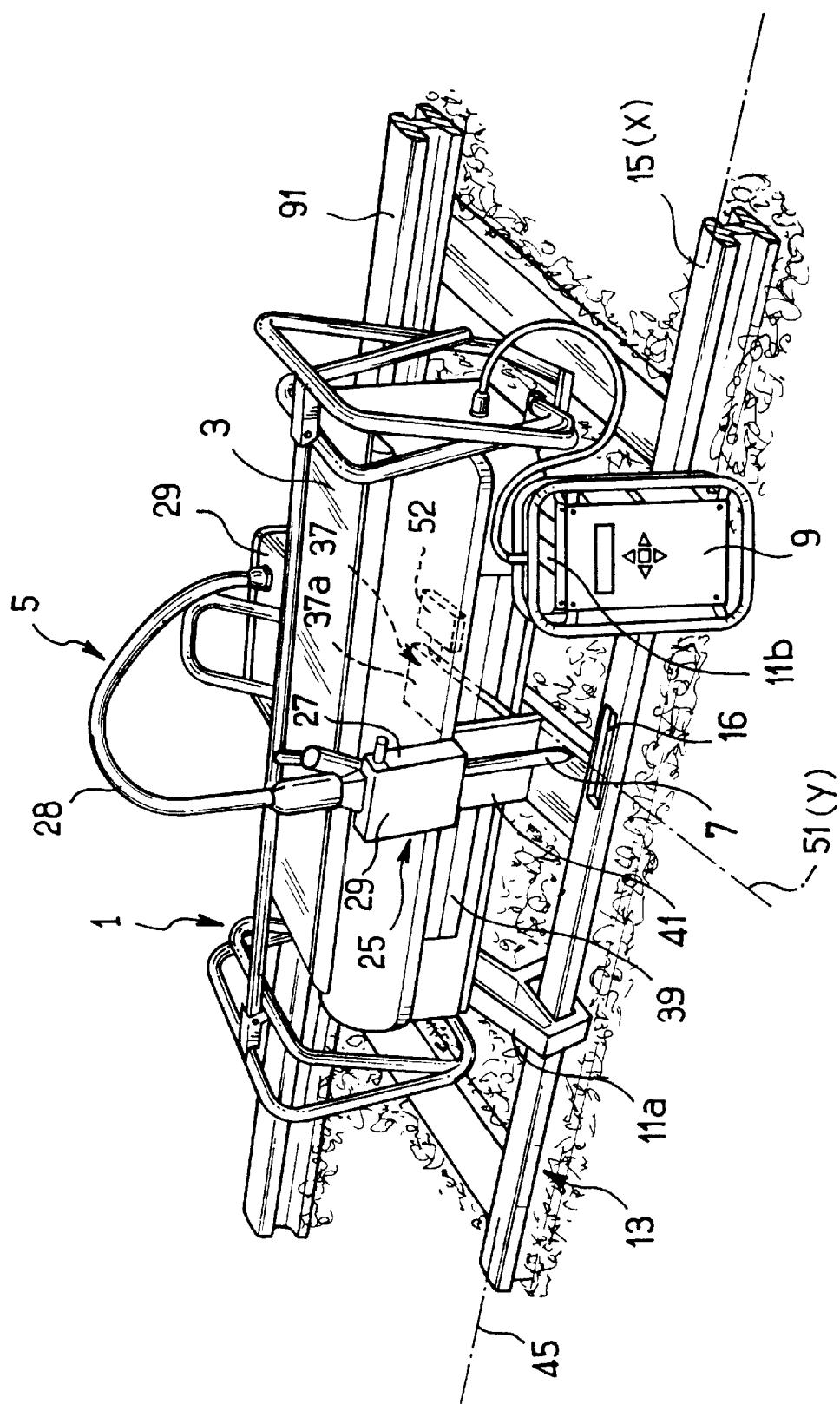

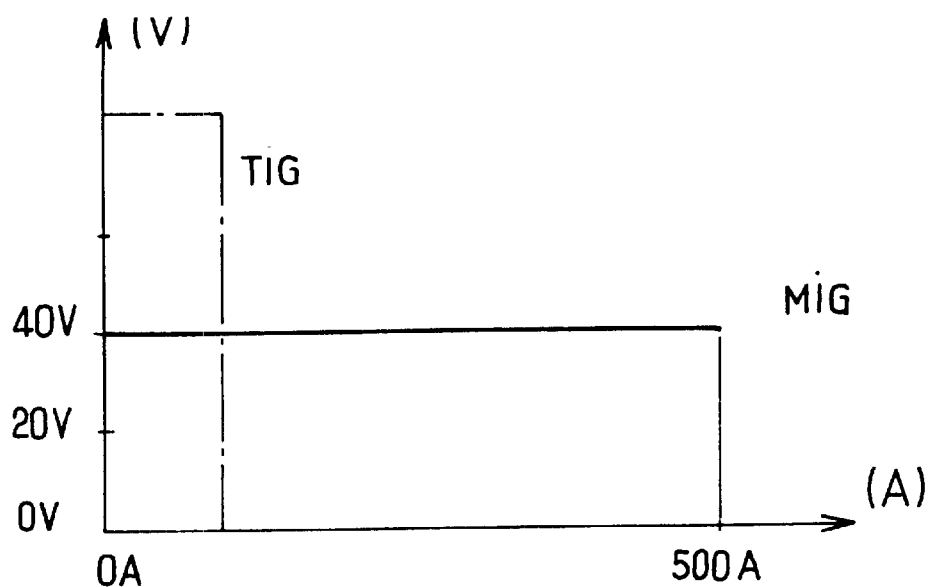
FIG_7
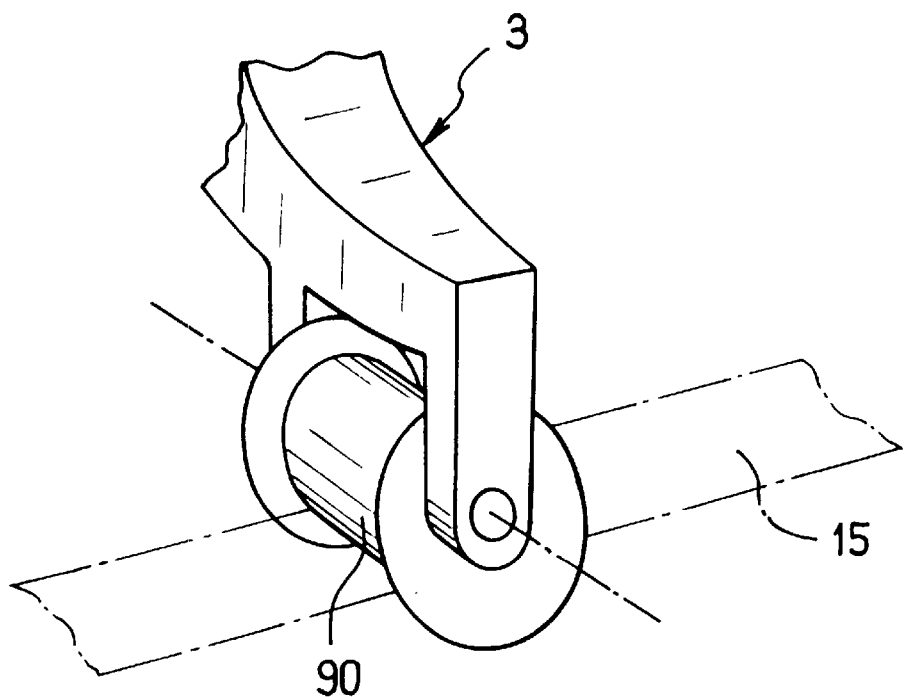
FIG_8

ARC WELDING SYSTEM AND A PROCESS THEREFOR

The invention relates to an arc welding system, using a welding wire, preferably a shielded welding wire.

Shielded welding wires are elongated elements (also called <<electrode>>) including a metallic material adapted for the welding. Typically, the wires comprise a metallic core surrounded by a shield, or a sleeve, with or without a shielding gas useful for the welding (especially an inert gas).

Such so-called <<shielded wires>> are well known, for example under the reference LINCOR 33 from LINCOLN-USA.

Further, in U.S. Pat. No. 4,672,173, is disclosed a gas-shielded arc welding apparatus for welding rails or shape steel, especially.

Below, the expression <<rail>> is used to define any weldable article including rail or the like on which a train, tramway . . . can be driven, or any shape steel pertaining to railways.

The apparatus includes a welding torch unit which is provided with a welding wire and which is movable along two different, transversal directions (typically the horizontal and vertical directions).

The apparatus also includes removable fixing means for removably fixing (or crimping) the welding apparatus to the rail <<and the like>>.

Further, torch moving means are included for moving the torch along the above-mentioned transversal directions, and controlling means (such as X-drive block and Y-drive block) connected to the torch moving means are controlling the movement of the welding torch unit in said transversal directions in front of the rail to be welded.

Even if the welding apparatus disclosed in U.S. Pat. No. 4,672,173 is described as a fully-automated apparatus, the welding process can be improved for performing the welding with a higher efficiency, especially in connection with the location of the welding zone on the rail and the like, so that the good or bad welding quality is not (or less) dependent on the skill of the operator, and the weld-time is shorter by less binding the operator to the work during the welding operation.

So, in accordance with one aspect of the invention, the above-mentioned controlling means (or control unit) comprise:

first controlling means for controlling a first movement of the torch unit substantially in front of the periphery (or perimetry) of the zone to be welded, so that welding geometrical locations are recorded (or read) on said zone, by means of recording means connected to a memory unit, so that said welding geometrical locations recorded on the rails are memorized, and second controlling means for automatically controlling a second displacement of the torch unit in front of the zone to be welded, within the limits of said reading and as a function of the welding geometrical locations, as memorized.

At said locations and at the appropriate rate for obtaining the highest efficiency, the operator is so able to pre-dispose and pre-adjust the displacements the torch unit has to follow for obtaining the welding. Further, memorizing said geometrical location readings and processing the corresponding data enable the operator to fully automatically get the corresponding required welding conditions.

Another object of the invention is to provide a welding process having the above-mentioned advantages.

So, in accordance with one aspect of the invention, the welding process of the invention comprises the steps of:

a) disposing, along at least one rail and the like, an electrical welding apparatus, or robot, using shielded electrically conductive wires adapted for maintaining or repairing rails and the like, the apparatus comprising a torch unit for welding a zone of the rail, a control unit, and fixing means for removably attaching (or crimping) the apparatus to the rail and the like, b) the torch unit is initially disposed at a referencing (geometrical) location with respect to the zone to be welded, c) welding geometrical features of said zone are read (or recorded), for obtaining reading (or recording) data, d) the reading data are addressed to a memory unit, and e) a determined welding program is initiated, as a function of said addressed reading data, so that:

the torch unit is displaced in front of the zone to be welded, within the limits of said zone, and in accordance with the recorded geometrical features thereof, the torch unit is provided with a shielded wire, and, the torch unit is supplied with an electrical power, for welding the rail and the like, as a function of said determined welding program.

An additional problem solved by the invention refers to determining the parameters to be used for the welding, as a function of the true and real situation in the field.

In the invention, two alternative, or cumulative, solutions are proposed:

first of all, prior to step e), the type of shielded wire to be used for the welding operation is selected by means of the control unit among different alternative choices, then the apparatus deduces therefrom:

the feeding rate for feeding the torch unit with said shielded wire, the supplying power for supplying said torch unit with the electrical power, and at least during the step e), the displacement rate for displacing the torch unit within the limits of the zone to be welded, and/or prior to step e), the type of rail to be welded is determined by means of the control unit, among various alternative choices, and then the apparatus deduces from said choice, as a function of the typology of the rail:

the feeding rate for feeding the torch unit with said shielded wire, the supplying power for supplying said torch unit with the electrical power, and the displacement rate for displacing the torch unit, within the limits of the zone to be welded.

It is to be noted that adapting the wire features (physico-chemical features, such as the composition thereof) and the feeding rate of the wire within the torch unit, especially, as a function of the rail typology (typically the carbon content of the rails) is often useful.

A further object of the invention is to determine the steps for reading the geometrical features of the zone to be welded, during step c) of the welding process.

The solution which is recommended is as follows:

during step b), the angular position of the torch unit with respect to the zone of the rail to be welded is preferably determined, during step c), the torch unit is displaced along the edge (or contour) of the welding zone, for reading the welding geometrical features, then, during step e), further to re-positioning the torch unit at said referencing position, the torch unit is displaced in front of the welding zone, in accordance with the welding program, for depositing a welding material on said welding zone.

Figure 2:
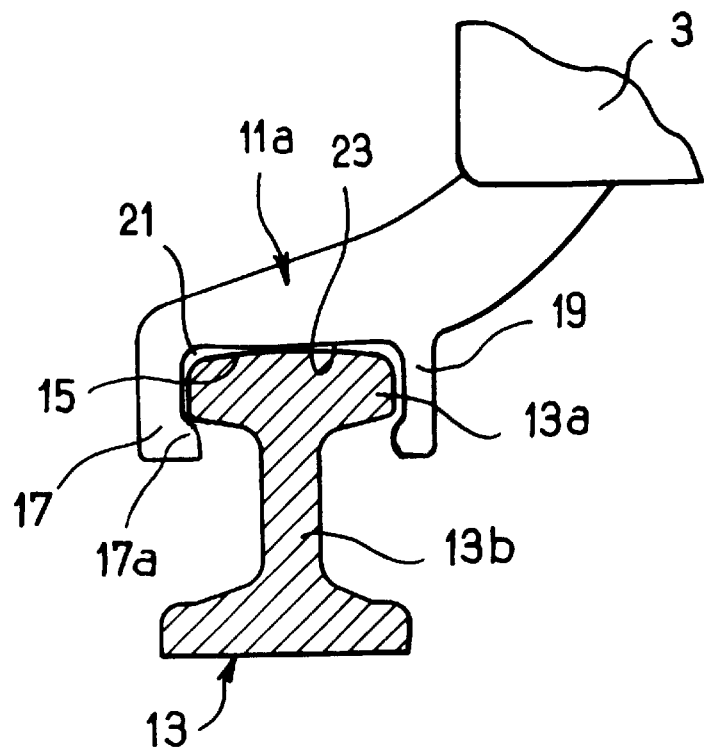
Figure 6:
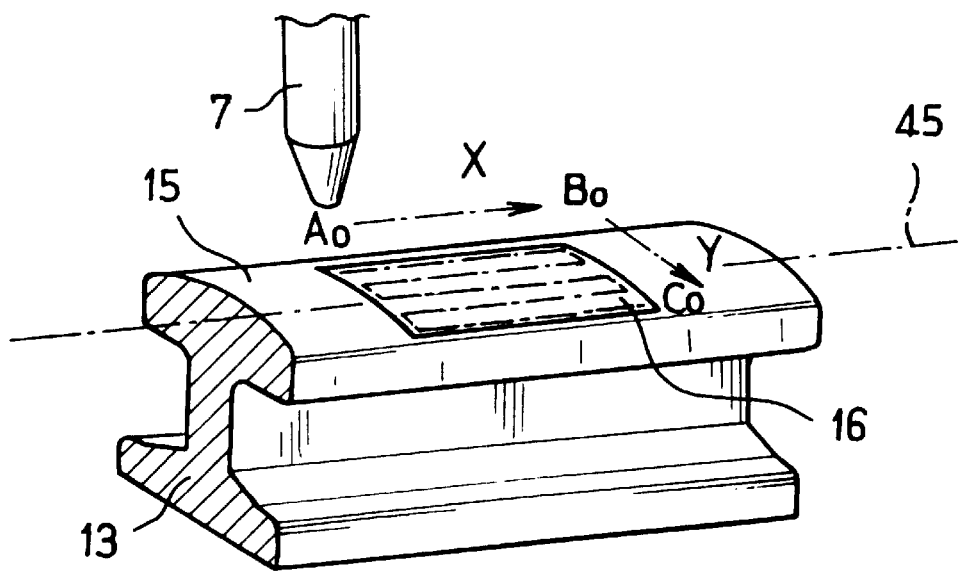
Figure 3:
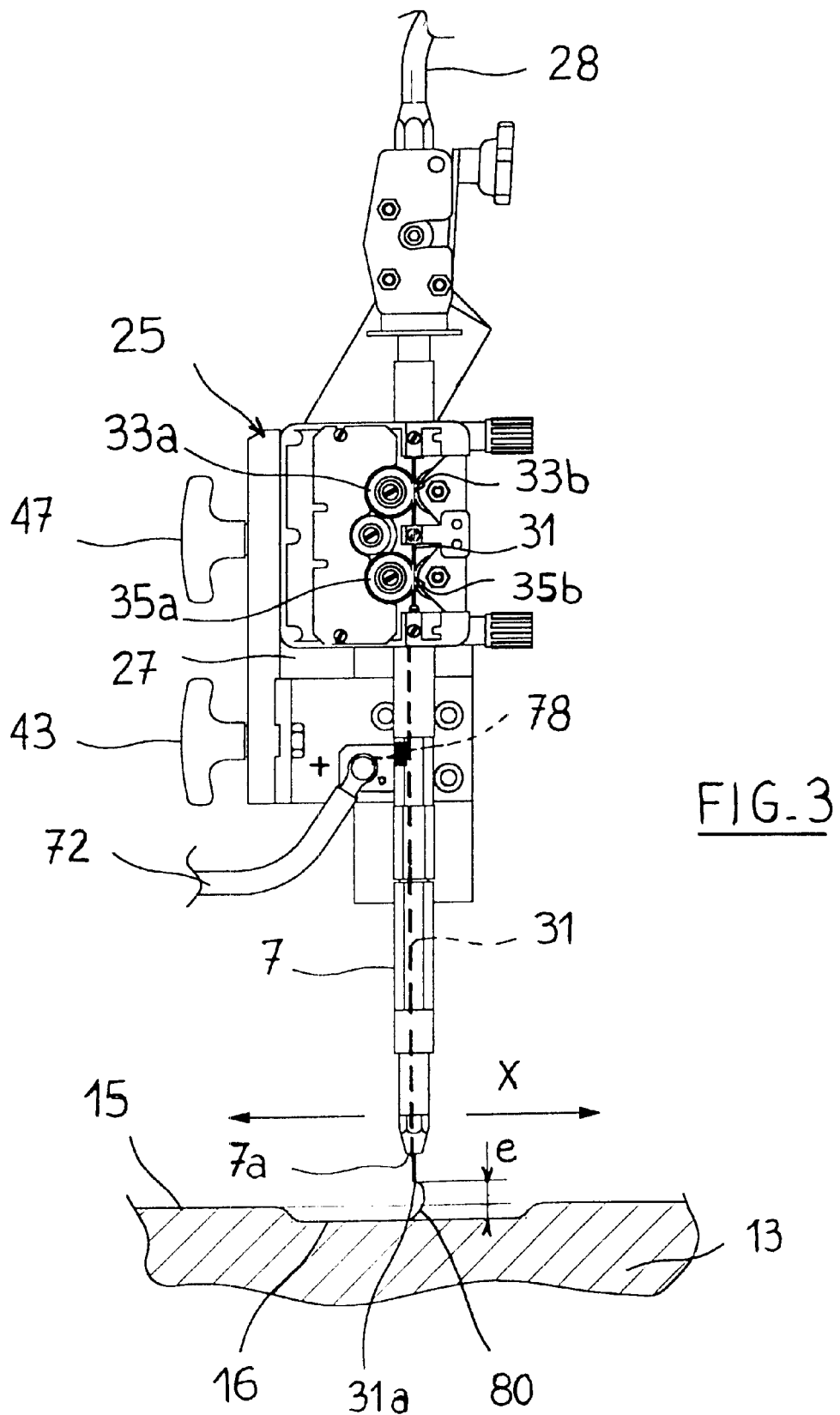
Figure 4:
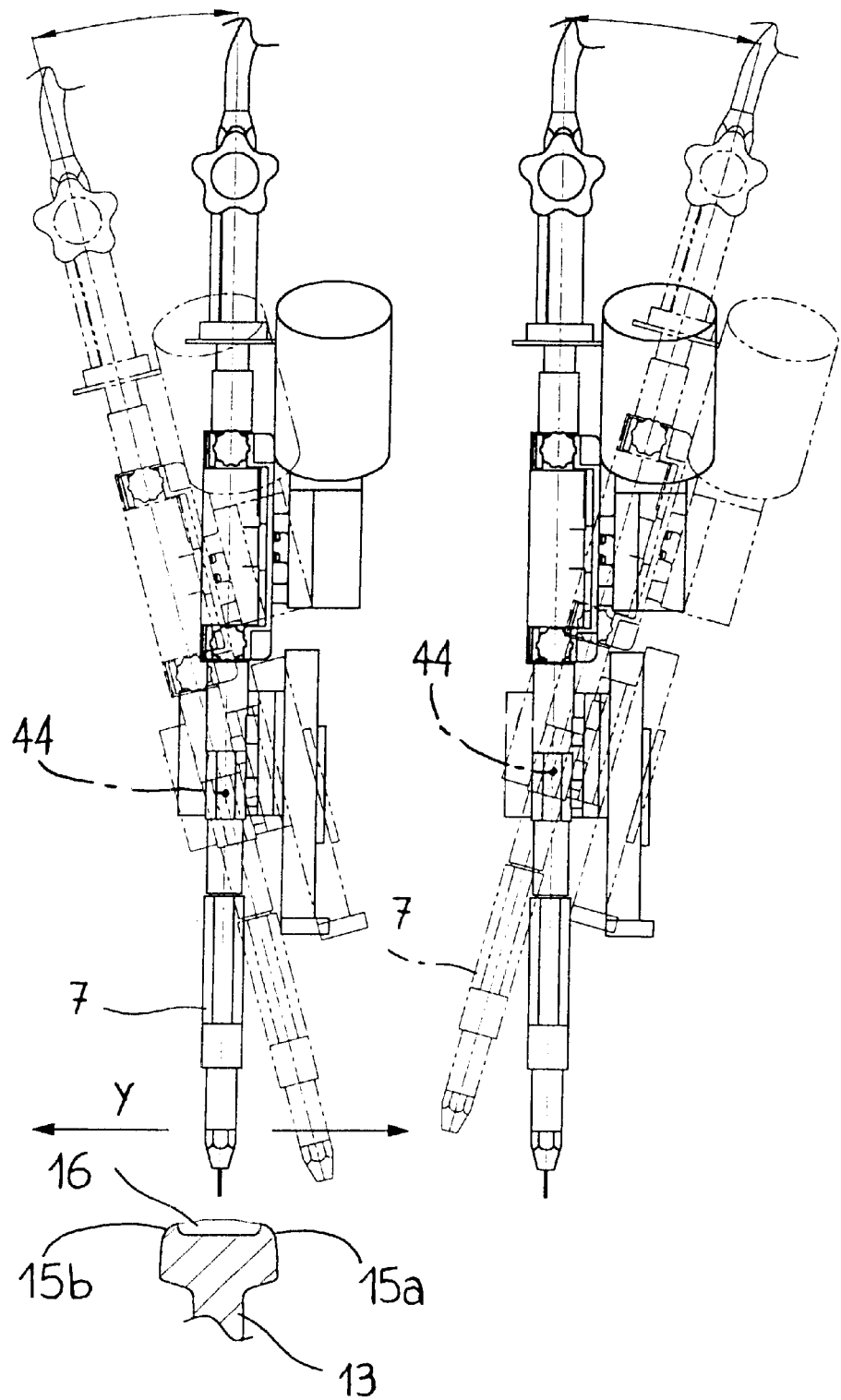
Figure 5:
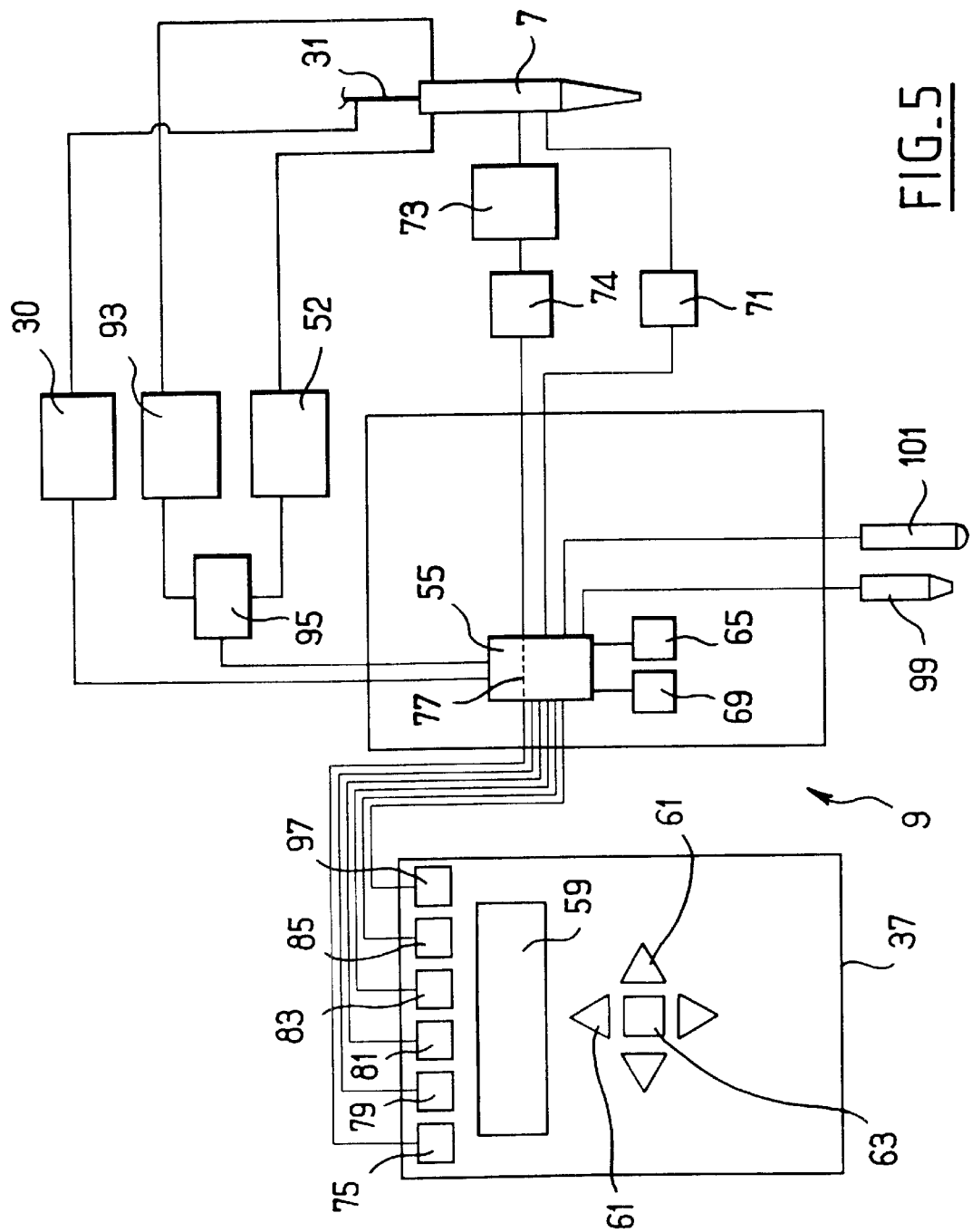

A more detailed description of the invention is following, with reference to the accompanying drawings, in which:

FIG. 1 is a general perspective view of an embodiment of the robot of the invention, FIG. 2 is a detail of an embodiment of a gripping means for removably maintaining the robot on the rail, FIG. 3 is a diagrammatic front view of a portion of the welding robot, in the vicinity of the torch unit, FIG. 4 diagrammatically shows the articulation and elevation movement of the torch unit, FIG. 5 diagrammatically shows an embodiment of the controlling unit, with its front closing put on one side, FIG. 6 diagrammatically shows geometrical locations defined on the rail for moving the torch unit in accordance with readings, FIG. 7 shows two welding graphs (electric arc voltage (V)/electric arc intensity (A)) which can be used in accordance with the invention, and FIG. 8 diagrammatically shows a wheel for driving the robot on a rail or the like.

In FIG. 1, the reference 1 generally refers to an electric arc welding robot, according to the invention.

This is a robot adapted for maintaining or repairing rails and the like, and especially rails located apart from rail switches.

The robot 1 comprises a framework 3 and a welding apparatus 5 comprising a torch unit 7 and a welding control unit 9, especially.

The framework 3 is provided with fixing means adapted for removably fixing the framework 3 to a rail 13. The fixing means comprise two supporting/gripping means 11a, 11b adapted for gripping an upper surface 15 of the rail which is damaged and which is thus to be repaired by providing the rail with a determined quantity of welding metal, in the hole 16 formed by the damage.

The hole 16 can have been made further to an emergency stop, followed by a moving of a high speed train, again.

The supporting/gripping means 11a, 11b are overlapping the rail 13 and are slightly overhanging the front face of the framework 3, whereas a torch unit 7 is disposed substantially in line with the axis extending between said supporting/gripping means, so that the robot is a self-aligning robot ready to self-aligning itself along the longitudinal axis of the rail 13.

In FIG. 2, one of the supporting/gripping means is shown, at a large-scale.

Means 11a (the other means is identical) comprises a front portion 17 having the shape of a hook (comprising a lower flange 17a) adapted to be disposed under the enlarged head 13a of the rail 13, just above the thinner center rib 13b of the rail. A back wall 19 makes said shape of hook completed.

Thus, as shown in FIG. 2, every supporting/gripping means is defining a hook, so that the head 13a of the rail is closely engaged within the hole 21 laterally bordered by the two gripping pliers 17 and 19.

In such a position, the retaining flange 17a is fixedly maintaining the framework, whereas the supporting surface 23 rests on the upper surface 15 of the rail.

In the instance, the weight of the framework 3 is in a overhanging position with respect to the supporting/gripping means 11a, 11b which are removably <<locking>> the robot on the rail, through a gripping action.

Between both the supporting/gripping means 11a, 11b, is disposed the torch unit 7.

The torch unit 7 is attached to its support 25 and is connected to shielded wire supplying means comprising a sleeve 27 and a drum 29. A motor 30 is driving the shielded wire along the drum, within the canal, and then within the torch unit.

FIGS. 1 and 3 show the torch unit 7 on its support 25, outside the framework 3.

The support 25 comprises a vertically opened box 27, the front closing portion of which, referenced 29, is put on one side, and a plate 37.

In FIG. 3, it can be seen that the torch unit (which is a rectilinear tube) is internally supplied with the shielded electrically conductive wire 31. Before passing through the torch unit, said wire is straightened up by means of two series of pressing wheel pairs 33a, 33b; 35a, 35b.

The torch unit is rigidly fixed to the box 27 which is removably attached to the plate 37. The plate 37 is a connecting element for fixing the box 27 to the framework 3.

The plate 37 comprises an horizontal plate element 37a which is engaged within the framework, through a slot 39, and a vertical plate element 41 to which the box 27 is fixed.

The referencing position, for such a fixation, is a position wherein the torch unit is vertical.

Preferably, the box 27 is adapted to slide with respect to its fixing vertical element 41, so that the vertical position of the welding head 7a of the torch unit 7 can be easily adapted with respect to the rail 13, when the robot is correctly disposed on the rail (variable distance e shown in FIG. 3). A knurl 43 is used for blocking the elevation height of the welding head 7a.

The torch 7 can also be rotatably movable around an axis 44 (see FIG. 4), parallel to the axis 45 extending between both the supporting/gripping means 11a, 11b.

As shown in FIG. 4, the torch unit can be inclined up to about 30° with respect to the vertical, so that a welding close to the lateral edges 15a or 15b of the rail is easier.

In FIG. 4, it is to be noted that both the illustrated positions show a rotation, together with a possible vertical movement of the welding head.

The knurl 47 is used for fixing the angular position.

The plate 37 is movable within the horizontal slot 39, parallely to the axis 45.

Further, the plate 37 is adapted to move back and front along the direction 51 which is perpendicular to the axis 45 and horizontal, in the example.

Both said directions are respectively referenced X and Y.

The movement of the torch unit along said directions X and/or Y is obtained by means of a motor (electric motor especially) 52 connected to a rack and pinion system.

Possibly, such a motor could also drive the vertical movement of the torch unit and/or its angular orientation (angle α).

If the torch unit is removably attached to the plate 37, the sleeve 28 and the drum 29 will also be so removable.

The drum 29 is supplied with a shielded wire which can have the shape of a roll.

The driving and control unit 9 controls the welding.

The unit 9 comprises especially a processing central unit 55 to which is connected a keyboard 57 including directional control knobs 61 and other operating knobs, such as referenced 63 (it can be a keyboard having six knobs or keys under LEXAN® type) and a display unit 59.

The data addressed by the keyboard 57 generate instructions and operate a <<welding program>> referenced 65.

The welding program is operated through the central processing unit 55 and the memory unit 69.

For operating the welding, FIG. 5 also shows that the motor 52 is connected to the driving and control unit 9, together with the central processing unit 55.

Further, said central processing unit is connected to a locating probe 71 (also called <<reading means for recording welding geometrical locations on the rail>>).

The locating probe 71 is connected to the torch unit 7 and to the memory unit 69, so that determined geometrical locations on the rail are read (or recorded) and memorized, during a pre-operating (or preliminary) phase, prior to the <<operating phase>> during which the welding is operated.

The central processing unit 55 is further connected to the motor 30 which supplies the torch unit with the shielded wire, the torch unit being itself connected to an electrical generator 73 adapted for generating an electrical energy (Voltage, intensity) adapted for obtaining the requested welding conditions, during the requested time interval.

The electrical generator 73 and the timer 74 are controlled by the central processing unit 55. From the electrical generator 73, an electrical wire 72 is electrically supplying the torch unit (+terminal 76; FIG. 4).

With such a control/operating unit 9, the welding process can typically be conducted as follows:

First of all, the robot is disposed over the rail 13, by gripping said rail with the supporting/gripping means 11a, 11b (see FIG. 2).

Thus, the robot is <<self-aligned>> along the axis 45 (which is the longitudinal axis of both the rail and the supporting/gripping means 11a, 11b), whereas the torch unit 7 is supposed to be disposed on its supporting plate 37.

In the pre-operating phase, the operator is driving the interface 57 through the corresponding control knob, such as the knob 63, so that said <<pre-operating phase>> of the welding program 65 is operated and the readings of the welding geometrical data of the zone to be welded are initiated (see FIG. 6).

More precisely, the flow chart of the program 65 brings the operator to operate a first controlling means (interface) diagrammatically shown in 75, what enables the operator to self-operate the displacement(s) of the torch unit, through the operation of the directional knob 61 and via the motor 52.

In FIG. 5, the dotted lines 77 indicate the authorized <<manual>> operation.

Initially, the torch unit 7 is in its initial position called <<referencing position>> A0. Said referencing position can be adjusted by the operator, so that said position is a typical location of the zone 16, such as a corner of the zone as illustrated in FIG. 6.

As soon as determined, the location A0 is recorded by the locating probe 71, further to a request of the program 65 displayed on the screen 59. The recorded data are then memorized in the memory unit 69.

From said referenced location A0, the operator operates a displacement of the torch unit substantially in front of the periphery (or perimetry) of the zone 16.

Plotting said zone by displacing the torch unit along the axis X (45) and Y (51) is recommended.

Thus, three plots A0, B0, C0, can be referenced (or beared), as illustrated in FIG. 6, especially further to a displacement of the torch unit along the axes X and Y.

Though such bearings, three of the four angles of the illustrated parallelogram can be referenced and memorized in the memory unit of the robot.

From those three plots, the central processing unit can calculate the surface (area) of the zone 16 to be welded, with reference to a predetermined shape (parallelogram, rectangle, triangle . . . ).

At the end of said pre-operating phase, the geometrical locating plots referenced by the probe 71 are thus memorized in the memory unit 69.

Then, the operator can initiate the following step of the program 65: further to a data request displayed on the display screen 69, the operator can especially initiate the following step of the effective welding, also called <<operative welding phase>>.

At that time, it can be useful to adjust the elevation (height) and/or the angular position of the torch unit 7, as explained above.

As soon as the torch unit is in the appropriate position, the program 65 automatically operates the welding operative phase, by operating the second controlling means referenced 79, further to a validation by the operator of a determined step of the program 65, as displayed on the screen 59.

While the steps of the program are in progress, the central processing unit 59 successively disposes the torch unit in its initial reference position A0 and operates the movement of the torch unit along the axes X and/or Y, at the rate required by the appropriate type of welding. At that time, the torch unit is supplied with an electrical energy by the power generator 73 and is supplied with the shielded welding wire.

In accordance with the programmed instructions and data (especially the data memorized in the memory unit 69 further to the readings operated by the probe 71), the displacement of the torch unit in front of the surface of the zone 16 to be welded can be operated according to various ways, such as the way shown in dotted lines in FIG. 6 (in the example, the torch unit is displaced within the limits of the parallelogram three corners of which among the four it has correspond to the read and memorized plots A0, B0, C0).

Since various types of welding exist (for example welding called <<TIG>>: welding at a constant current intensity, or <<MIG>>: welding at a constant voltage), a determined type of welding has been initially selected for operating the program 65, such as for example the <<MIG>> welding a graph of which is illustrated in FIG. 7 (showing the electric arc voltage V as a function of the electric arc intensity A, continuous line).

As soon as the welding surface 16 is <<scanned>> or swept by the torch unit, displacement of said torch unit stopped (this displacement could have been operated from the plot A0 up to the plot C0).

Different successive passes can be useful to deposit the welding material and to fill the scanned area 16.

For example, two successive passes can be automatically operated by the program, including an intermediate step for allowing the operator to clean the welding zone and abrade the swellings of welding material. At the end of the second pass, a complete filling of the area 16, what will give the rail a substantially planar and continuous surface, without hole again.

For protecting the operator, a removable cover (not illustrated) can recover the torch unit and the zone of rail to be welded.

For controlling the created electric arc, it is further recommended to provide the welding apparatus with a first additional cable adapted for measuring the welding voltage, together with a second additional cable adapted for measuring (recording) the welding current intensity in circulation the torch unit (the cables are not illustrated).

Through the wire 72 (+), the torch unit is supplied with the electrical power.

More precisely, an electrically conductive contact pad 78 is connected to the wire 72 for electrifying the metallic shielded wire 31 (also called <<electrode>>), the head of which appears in 31a, beyond the free end 7a of the torch unit. The rail 13 is <<the Earth>>. The distance e between the head 31a and the rail is then adjusted for creating an electric arc 80, so that the metal of the electrode 31 is deposited within the hole, or slot, 16 which is to be filled.

As above-mentioned, the specific welding features (such as <<MIG>> in the example) have previously been entered in the welding program, in the memory unit At a determined step of the program, the operator can be allowed to choose between different types of weldings.

For example, a welding operation in a <<TIG>> mode can be selected, so that an evolution V/A as illustrated in dotted lines in FIG. 7 can be operated.

In FIG. 5, a <<third controlling means>> 81 (located on the keyboard 57 and connected to the central processing unit 55) diagrammatically shows the interface circuit allowing such a choice between the different types of welding operations.

A choice between various shielded wires (for example a gas-shielded wire) can be offered to the operator before the torch unit is supplied with said wire.

In FIG. 5, the reference 83 diagrammatically shows the fourth controlling means which enables the operator to provide the robot with the data indicating the type of shielded wire he decided to put in the drum 29.

Such a selection can especially be useful for welding a railway switch which is typically made of an alloyed steel (chemically, or physico-chemically, different from a longitudinal rail).

In relation to the above, it can be decided to further select the type of <<rail and the like>> on which the welding operation is to be operated.

This is the object of the <<fifth controlling means>> 85 which allows the operator to provide the robot with data indicating the determined subprogram which is to be operated to initiate the corresponding welding operation specifically adapted to the selected rail.

It is to be noted that the selection operated between different types of shielded wire, different types of welding operation (TIG, MIG . . . ), different types of rail (longitudinal rail in a specific steel, railway switches made of another steel . . . ) induce modifications of the operative procedure for operating the motor 30 and/or the motor 52 (speed, operative time . . . ) together with modifications of the data addressed by the central processing unit 55. But all those instructions and data are processed in the welding program 65.

Especially if the robot is often to be displaced along the rail or the like, it could be considered as useful to have the framework 3 motorized and to provide the robot with wheels (to replace the hooks 11a, 11b). The solution is diagrammatically shown in 90 in FIG. 8, for allowing the framework to roll along a rail.

At least three wheels should be useful: two wheels as a replacement for the hooks 11a, 11b (so that the two wheels and the torch unit 7 are substantially aligned along their common axis 45) and a third wheel set off at a free end of a shaft (not illustrated) on the rear side of the framework, so that said third wheel is applied on the second rail of the rail pair along which the robot is disposed (see the rail referenced 91 in FIG. 1).

Especially for repairing railway switches, it is recommended to replace the motor 52 as used for the longitudinal displacement of the torch unit along the horizontal axis 45 by a motor 93 adapted for driving the wheels 91 along said axis 45.

For driving, or controlling, the motor 93, FIG. 5 shows a switch element 95 (relay) interposed between the central processing unit 55 and the motor 52. The switch 95 is operatively connected with a sixth controlling means 97 operated by the operator, through the keyboard 57, as a response to a request of the program 65 automatically displayed on the screen 59.

So, if the operator answers said request and gives the robot the corresponding order, the controlling interface initiates a displacement of the torch unit and the framework along the longitudinal axis 45 (X axis) whereas the motor 52 takes ponctually over, for displacing the torch unit along the axis 51 (Y axis), only. Such a procedure is operated during both the preoperative phase (reading and memorizing of the perimetric limit or contour of the welding zone) and the following operative welding phase.

It is to be understood that all, or part, of the <<controlling means>> 75, 79, 81, 83 . . . 97 can be combined with each other for improving the welding conditions (rate for displacing the torch unit, voltage or electrical current intensity to be delivered, welding time, rate for filling the torch unit with the shielded wire, especially).

It is also to be noted that it could be useful to read the ambient temperature at the time of the welding.

So, an ambient temperature probe 89 is diagrammatically illustrated in FIG. 5. Such a temperature reading is addressed to the memory 69, and predetermined instructions in the welding program use such a data for adapting the electrical energy delivered by the power generator 73, as a function of the outside climatic conditions at the time of the welding (with such a procedure, the electrical energy delivered to the torch unit, the time for supplying said torch unit with such an electrical energy, together with the rate for displacing the torch unit, can be adjusted).

The robot could also be provided with an electronic data reader 101 adapted for reading for example a bar-code registered on an appropriate support (for example a plate fixed to the rail or the like).

For every information in relation to such an electronic data reader 101 (for example an optical pen), or in relation to the temperature probe 89, reference is made to FR-A-2 572 326 (page 4, line 24-page 5, line 28 especially) the content of which is incorporated herein, by reference.

It is to be noted that the robot of the invention can be used on various rails, such as railway rails, underground rails, tramway rails, . . . including rails having a shape different from the illustrated shape.

It is also to be noted that the pre-operative (or preliminary) readings could possibly be operated through a specific probe or electronic reader as a replacement of the torch unit 7 and probe 71. However, such a solution is not recommended.

Further, for filling the zone 16 with the requested mass of welding material (such an operation is often called <<filling again>>), different displacements of the torch unit in front of the zone can be followed, such as a combination between a longitudinal and a transversal displacement.

What is claimed is:

1. An electric arc welding robot for welding a zone of a first rail of a pair of parallel rails comprising said first rail and a second rail, each rail having a longitudinal axis and comprising an upper enlarged head located above a thinner center rib, the robot comprising:

a framework comprising two gripping means for removably fixing the framework to the head of the first rail, substantially along the longitudinal axis thereof, the framework being adapted to be disposed between the rails, in an overhanging position with respect to the first rail and the gripping means, a movable, electric arc torch unit for operating the welding at said zone, the torch unit being attached to the framework and located between the two gripping means, substantially coaxial therewith, first controlling means for controlling a first displacement of the torch unit with respect to the framework, substantially along the periphery of the zone to be welded, so that welding geometrical locations are read on said zone, by means of reading means connected to a memory unit, for memorizing said welding geometrical locations read on the first rail, and, second controlling means for automatically controlling a second displacement of the torch unit with respect to the framework, substantially along the periphery of the zone to be welded, within the limits of said reading and as a function of the welding geometrical locations, as memorized.

2. The robot of claim 1, wherein said gripping means rests upon and overlaps the first rail.

3. The robot of claim 2 wherein said gripping means extends outward from a side of the framework proximate said first rail, and wherein said framework is supported upon and between said first and second rails via said gripping means, said robot being free from contact with a ground surface supporting said rails.

4. The robot of claim 3, wherein said gripping means includes hooks over the first rail.

5. An electric arc welding robot for welding a zone of a first rail of a pair of parallel rails comprising said first rail and a second rail, each rail having a longitudinal axis and comprising an upper enlarged head located above a thinner center rib, the robot comprising:

a framework comprising two supporting means for removably applying the robot to the head of the first rail, substantially along the longitudinal axis thereof, the framework being adapted to be disposed between the rails, in a overhanging position with respect to the first rail and the supporting means, a movable, electric arc torch unit provided with a shielded electrically conductive wire, for operating the welding at said zone, the torch unit being attached to the framework and located between the two supporting means, substantially coaxial therewith, first torch moving means for moving the electric arc torch unit with respect to the framework along two different transversal directions, second torch rotating means for rotating the torch unit around an axis parallel to the axis extending between the two supporting means, a control unit connected to the first and second torch moving means, for controlling the movement of the electric arc torch unit in said transversal directions, over the zone to be welded, the control unit comprising:

first controlling means for controlling a first displacement of the torch unit with respect to the framework substantially along the periphery of the zone to be welded, so that welding geometrical locations are read on said zone, by means of reading means connected to a memory unit, for memorizing said welding geometrical locations read on the first rail, and, second controlling means for automatically controlling a second displacement of the torch unit with respect to the framework substantially along the zone to be welded, within the limits of said reading and as a function of the welding geometrical locations, as memorized.

6. The robot of claim 5, wherein said supporting means rests upon and overlaps the first rail.

7. The robot of claim 6, wherein said supporting means extends outward from a side of the framework proximate said first rail, and wherein said framework is supported upon and between said first and second rails via said supporting means, said robot being free from contact with a ground surface supporting said rails.

8. The robot of claim 7, wherein said supporting means includes hooks over the first rail.

9. The robot of claim 7, wherein said supporting means includes at least one of hooks and wheels over the first rail.

10. A welding process for operating an electric arc welding on a first rail of a pair of parallel rails comprising a first rail and a second rail, each rail having a longitudinal axis, the process comprising the steps of:

a) supplying an electric arc welding robot comprising a framework, a memory unit and a movable torch unit adapted to be provided with a welding wire, for welding a zone of the first rail, the framework comprising two gripping means for removably applying the robot to the first rail, substantially along the longitudinal axis thereof, the framework being disposed in a overhanging position with respect the gripping means, and the torch being located substantially coaxial with the two gripping means, b) disposing the framework between the rails, in a overhanging position with respect to the first rail and the gripping means and gripping the first rail with the gripping means, c) disposing the torch unit over the zone of the first rail to be welded, between the two gripping means, at a referencing geometrical location with respect to said zone, d) reading on said zone welding geometrical features thereof, for obtaining reading data, e) addressing the reading data to the memory unit, and f) having a determined welding program ran, as a function of said addressed reading data, the step of running comprising:

providing the torch unit with the welding wire, supplying the torch unit with an electrical power, for arc welding the zone, as a function of said determined welding program and, displacing the torch unit in front of the zone to be welded, within the limits of said zone, in accordance with the read geometrical features thereof.

11. The process of claim 10 wherein, prior to step f) a type of welding wire the torch unit is to be provided with is selected among different choices and addressed to the memory, then the robot deduces therefrom:

a feeding rate, for feeding the torch unit with said welding wire, at said feeding rate, a supplying electrical power, for supplying said torch unit with said electrical power, and at least during the step f), a displacement rate adapted to the selected welding wire, for displacing the torch unit within the limits of the zone to be welded, at said determined rate.

12. The process of claim 10 wherein, prior to step f) a type of rail to be welded is determined among various choices of rails having different typologies and addressed to the memory, then the robot deduces from said choice, as a function of the typology of the rail:

a feeding rate for feeding the torch unit with said welding wire, at said feeding rate, a supplying electrical power for supplying said torch unit with said electrical power, and a displacement rate adapted to the determined type of rail, for displacing the torch unit, within the limits of the zone to be welded, at said displacement rate.

13. The process of claim 10 wherein:

the step of reading welding geometrical features of the zone comprises the step of displacing the torch unit along the periphery of the welding zone, for reading said welding geometrical features, and, the step of having the determined welding program ran comprises the step of re-positioning the torch unit at said referencing geometrical location, before displacing the torch unit over the welding zone, in accordance with the welding program, for depositing a welding material on said welding zone.

14. An electric arc welding robot for welding a zone of a first rail of a pair of parallel rails comprising said first rail and a second rail, each rail having a longitudinal axis, the robot comprising:

a framework comprising two supporting means for removably applying the robot on the first rail, substantially along the longitudinal axis thereof, a movable, electric arc torch unit for operating the welding at said zone, the torch unit being attached to the framework and located substantially coaxial with said two supporting means, first controlling means for controlling a first displacement of the torch unit with respect to the framework, substantially along the periphery of the zone to be welded, so that welding geometrical locations are read on said zone, by means of reading means connected to a memory unit, for memorizing said welding geometrical locations read on the first rail, second controlling means for automatically controlling a second displacement of the torch unit with respect to the framework, substantially along the zone to be welded, within the limits of said reading and as a function of the welding geometrical locations, as memorized, and, an ambient temperature probe for sensing the ambient temperature at the time of the welding, the temperature probe being connected to the memory unit and to a central processing unit, so that the welding is operated as a function of the sensed temperature.

* * * * *